United States Patent [19]

Goodrich et al.

[11] Patent Number: 4,608,646
[45] Date of Patent: Aug. 26, 1986

[54] PROGRAMMABLE PARTS FEEDER

[75] Inventors: Jerry L. Goodrich, State College, Pa.; William L. Devlin, Evans, Colo.

[73] Assignee: Programmable Orienting Systems, Inc., Port Mathilda, Pa.

[21] Appl. No.: 664,852

[22] Filed: Oct. 25, 1984

[51] Int. Cl.⁴ .................. B65G 43/08; B65G 47/24; G05B 19/00
[52] U.S. Cl. ................................ 364/478; 198/391; 198/395; 209/598
[58] Field of Search ............. 250/223 R; 198/391, 198/395, 398; 221/160; 364/468, 478, 479; 358/101; 209/588, 598

[56] References Cited

U.S. PATENT DOCUMENTS

| | | | |
|---|---|---|---|
| 3,233,719 | 2/1966 | Engel | 198/398 |
| 3,395,269 | 7/1968 | Klapes | 250/223 R |
| 3,840,857 | 10/1974 | Knight et al. | 250/223 R |
| 3,956,629 | 5/1976 | Gomm et al. | 250/223 R |
| 4,333,558 | 6/1982 | Nonaka et al. | 198/391 |
| 4,360,274 | 11/1982 | Norton-Wayne | 250/223 R |
| 4,409,649 | 10/1983 | Heeger | 364/479 |
| 4,414,566 | 11/1983 | Peyton et al. | 358/101 |
| 4,457,622 | 7/1984 | Kato et al. | 250/223 R |
| 4,564,913 | 1/1986 | Yomogida et al. | 364/478 |

FOREIGN PATENT DOCUMENTS 55-40183  3/1980  Japan .................................... 198/391

Primary Examiner—Joseph E. Valenza
Assistant Examiner—Daniel R. Alexander
Attorney, Agent, or Firm—Brady, O'Boyle & Gates

[57] ABSTRACT

A micro-controller system for recognizing and identifying same or dissimilar parts being transferred along the track of a parts feeder, such as a bowl feeder, as well as checking the part orientation, and sorting the oriented parts in a predetermined repetitive sequence. Part recognition and sequencing is programmable upon user demand. Part recognition includes a part silhouette recognizer comprised of a set of light sensors coupled to an apertured grid located in a part feeding track. The silhouette image of each part to be sorted is first digitized and stored in the memory of the micro-controller in a position associated with an identifying part number. Also, the sequence of the various parts is stored in the memory of the micro-controller. Thereafter, as the parts are being fed over the grid, each part is compared against a corresponding stored image in the proper position of the sequence with the wrong or improperly oriented parts being rejected by being blown off the track by an air jet directed across the feeder track while proper part recognition will result in a turn off of the air jet permitting the part to pass and be delivered to a feeder output station.

24 Claims, 13 Drawing Figures

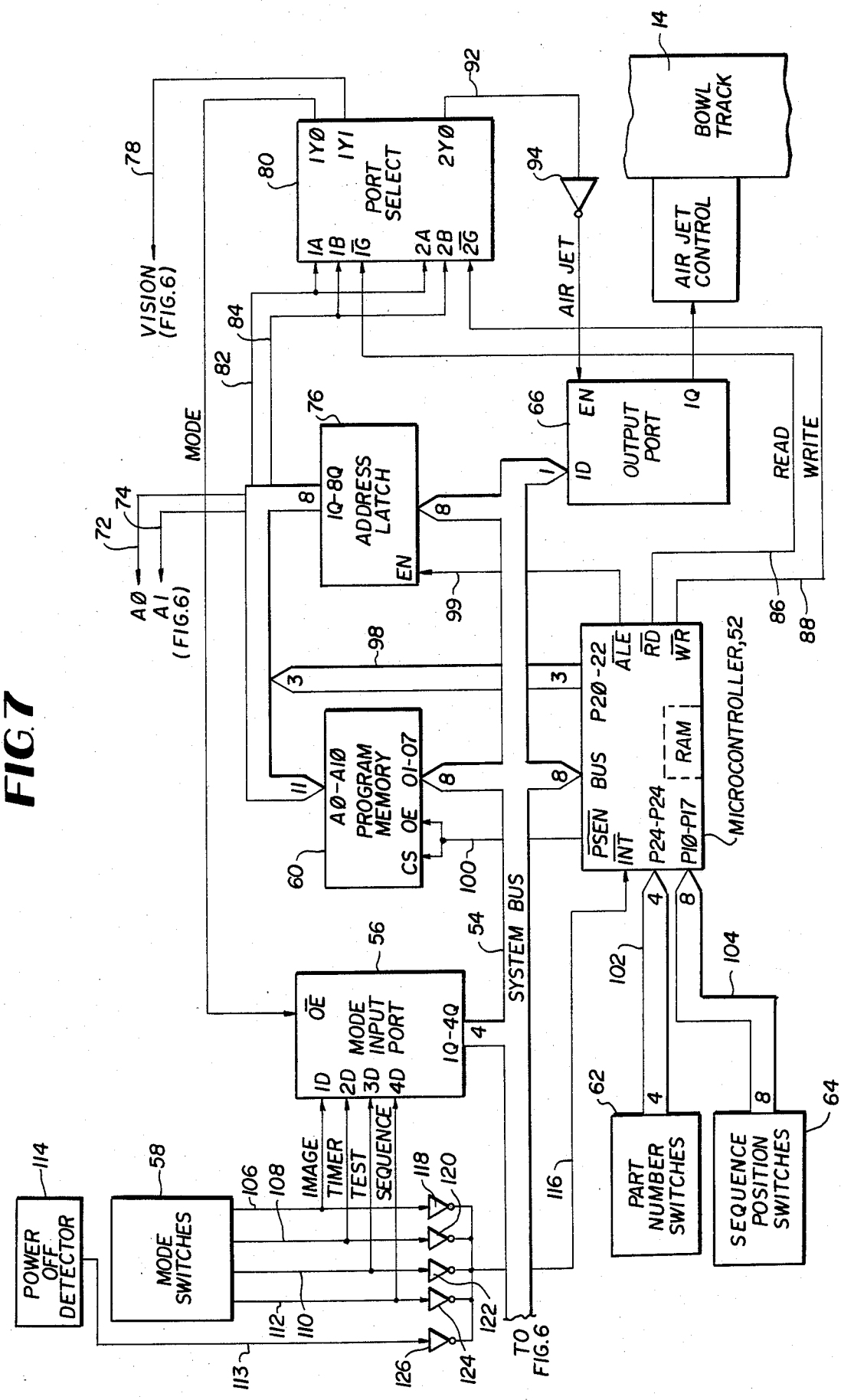

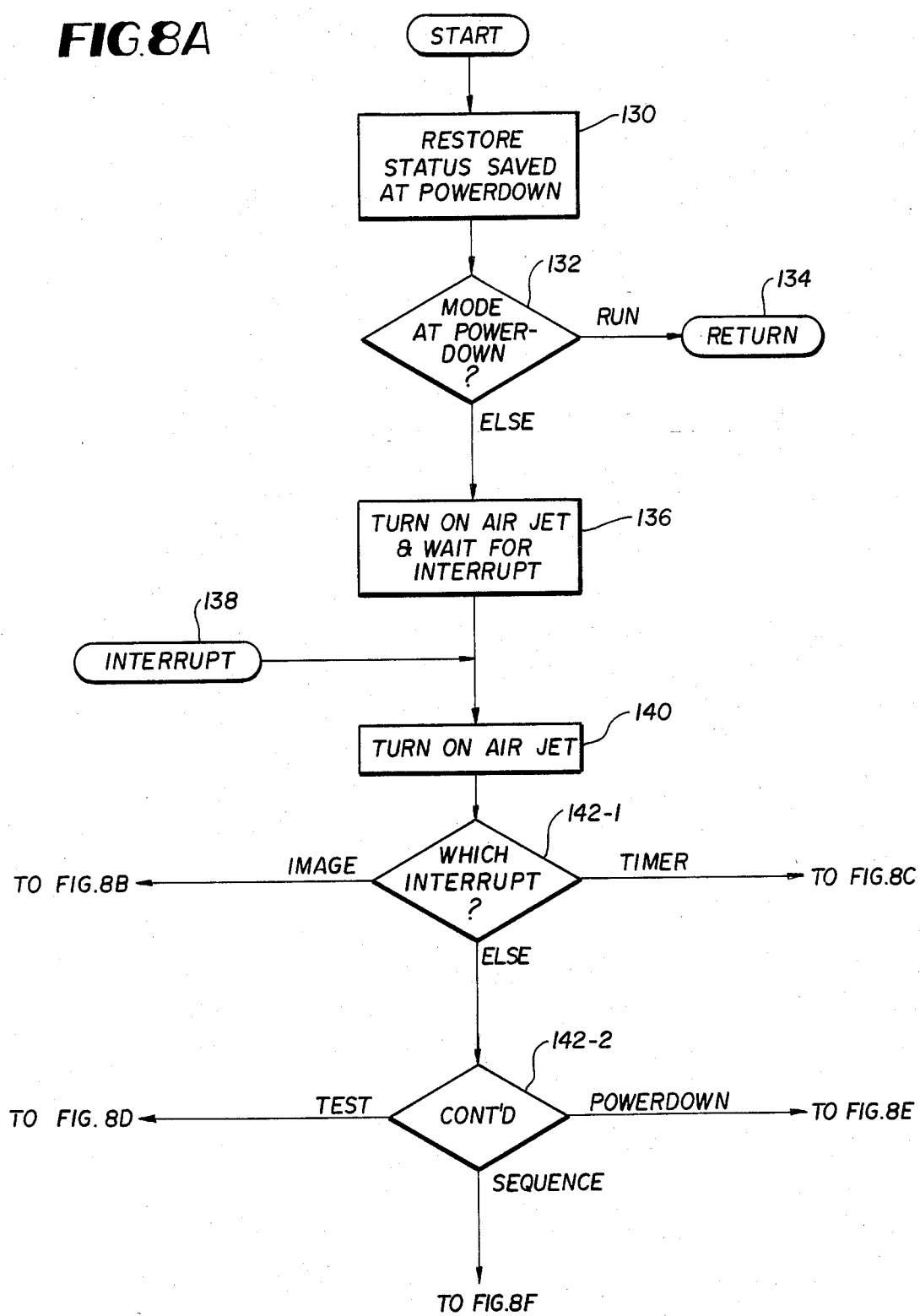

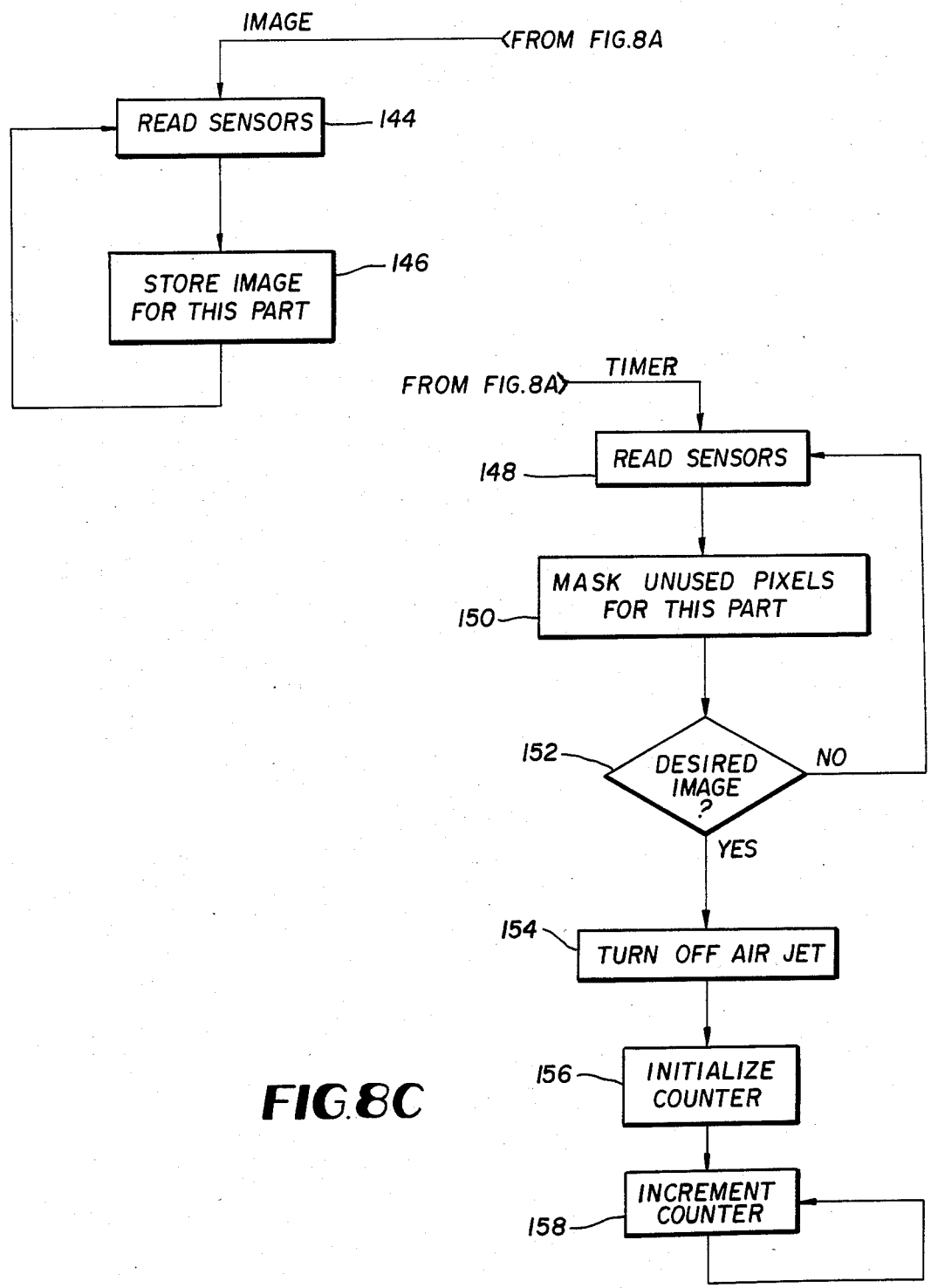

PROGRAMMABLE PARTS FEEDER

BACKGROUND OF THE INVENTION

This invention relates generally to parts feeding apparatus and more particularly to a programmable parts feeding system capable of identifying, orienting and sequencing a variety of parts in which the parts themselves can have mutually different appearances.

Almost all manufacturing requires that workpieces be presented to operations in a predetermined orientation. The importance of this problem has long been recognized in mass production industries where workpiece orientation is usually accomplished by dedicated parts feeders. However, in batch production, the quantity of a particular part produced does not justify the cost of a dedicated parts feeder.

Flexible manufacturing systems and flexible assembly systems are attempts to deal with the automation of batch production. These systems usually employ programmable machines such as computer numerically controlled (CNC) machines and industrial robots to achieve their flexibility. Since the programs for these machines are easy to change, these machines are well suited to batch production.

Attempts to implement flexible manufacturing systems and especially flexible assembly systems have led to the recognition of the need for flexible parts feeding and orientation equipment.

Where the problem of workpiece orientation and flexible manufacturing systems has been attempted, the most common approach has been to use some type of sensing system, either visual or tactile in conjunction with a robot. Such systems, however, tend to be too slow and costly to be useful in an industrial environment. What is required is a single programmable feeder able to feed a wide range of parts as opposed to a conventional parts feeder which is specially tooled and dedicated to feed one particular type of part. Ideally the programmable feeder should be at least as flexible as the rest of the flexible manufacturing system.

Several types of parts feeders could be implemented as programmable feeders; however, the proven ability of the vibrating bowl feeder to be used with a broad range of parts makes it particularly adaptable for use as a programmable feeder.

DESCRIPTION OF THE PRIOR ART

Various types of automated or semi-automated sorting and inspection apparatus and methods are well known to those skilled in the art. One known system, for example, includes an array of photo-conductive detecting elements which operate such that when a part does not have a predetermined orientation position, it is rejected. The system can be altered to accommodate the parts by manually changing the location or number of sensing elements; however, the system does not have the capability of operating with a variety of types of parts simultaneously and cannot therefore identify, sort different parts of a predetermined sequence. Also, known are systems which include profile detection apparatus. Still other systems are known which correlate or compare a sensed image against a pre-stored image. While such systems including, for example, TV type systems, appear to be capable of operating as intended, they exhibit a relatively slow response time and thus are incapable of operating at full speed with a variety of types of parts simultaneously such that a programmed sequence of parts, both like and dislike one another, in any desired pattern can be repetitively provided at the same output station.

Typical examples of the known prior art include: U.S. Pat. No. 3,956,629, entitled, "Inspection Method And Apparatus", issued to P. J. Gomm, et al. on May 11, 1976; U.S. Pat. No. 4,225,031, entitled, "Article Orientation Device", issued to D. Frisbie, et al. on Sept. 30, 1980; U.S. Pat. No. 4,333,558, entitled, "Photoelectric Control System For Parts Orientation", issued to T. Nonaka, et al. on June 8, 1982; and U.S. Pat. No. 4,414,566, entitled, "Sorting And Inspection Apparatus And Method", issued to J. J. Peyton, et al. on Nov. 8, 1983.

Accordingly, it is an object of the present invention to provide an improvement in parts feeding systems.

Another object of the invention is to provide a programmable parts feeding system.

And still another object of the invention is to provide a parts feeding system particularly adapted for flexible automation applications and one providing a selectable sequence of parts at the same point of delivery.

And yet another object of the invention is to provide a parts feeding system which permits simple programming of parts identification as well as the sequencing of the same or different type parts in a repetitive cycle.

Still a further object of the invention is to provide a parts feeding system particularly adapted for use with robots or conventional batch production machinery.

SUMMARY

Briefly, the foregoing and other objects of the invention are achieved by a method and apparatus including a parts feeding system which is comprised of among other things, a programmable silhouette recognizer including an array of light detecting circuits coupled to a multi-apertured grid, having a predetermined hole pattern, located opposite a light source and producing a shadow image in response to the interrupted pattern of light by a part traveling along a track. A micro-controller operable in accordance with a stored program and coupled to the light detecting circuits, includes means for storing the image of each different type part as it traverses the apertured grid and the time required for its passage. Also each type of part is assigned a part number by a programming operator from a set of part number switches coupled to the micro-controller. The respective part numbers are used to determine the storage locations in memory for the data associated with each part. Additionally, the positional sequence of one or more part types identified by the respective part numbers are entered into memory from a set of sequence position switches also coupled to the micro-controller. During a parts feeding operation, each part in a sequence is matched against a respective stored image and a correct match operates to turn off an air jet flowing across the feeding track which would otherwise reject either an incorrect part in the sequence or one which has an improper orientation. Part programming and sequence programming as well as part feeding operations are furthermore facilitated by a set of mode switches coupled to the micro-controller and which operate to generate program interrupt signals which cause the micro-controller to branch to the required operating mode.

BRIEF DESCRIPTION OF THE DRAWINGS

While the present invention is defined in the claims annexed to and forming a part of this specification, a better understanding can be had by reference to the following description when taken in conjunction with the accompanying drawings in which:

FIG. 7 is an electrical schematic diagram further illustrative of the preferred embodiment of the subject invention; and FIGS. 8A through 8F comprise a flow chart illustrative of the operational steps implemented in accordance with a stored program controlling the micro-controller shown in FIG. 7.

DESCRIPTION OF THE PREFERRED EMBODIMENTS

Figure 1:
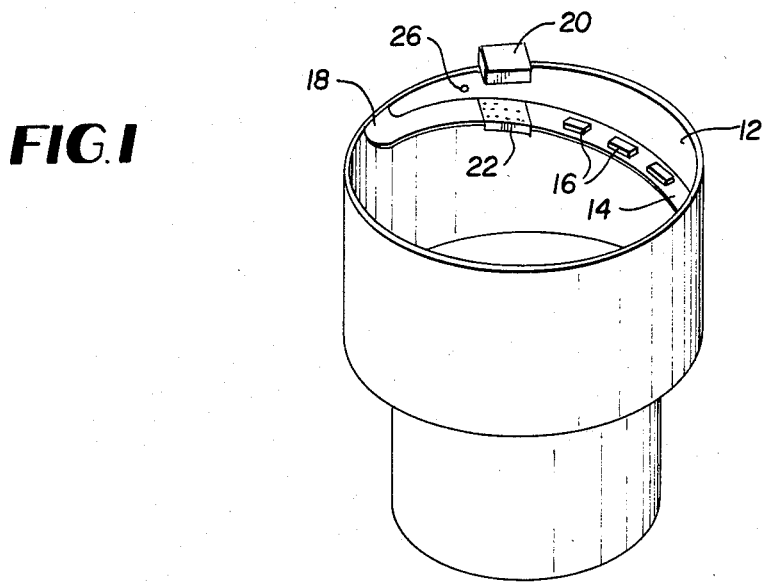
FIG. 1 is a simplified perspective view of a parts feeder employing the concept of the subject invention.

Referring now to the drawings and more particularly to FIG. 1, the most common vibratory parts feeder comprises a vibratory bowl feeder 10 including a bowl 12 having an internal helical feeder track 14. The bowl 10 is supported on a base 15 and includes electromagnets, not shown, which vibrate the bowl 12 in a twisting motion. The vibrating motion of the bowl 12 causes parts 16 contained therein to move upward along the track 14 toward an output station 18. It should be noted, however, that the present invention is not limited to a bowl feeder since, when desired, a linear track feeder or other type of feeding and orienting system can be used.

Although not shown, passive mechanical devices such as programmable tooling modules are placed at various locations along the track 14 and operate in their respective manner to reject parts back into the bowl. Typically, the first tooling module encountered is a wiper whose purpose is two-fold. First it assures that parts are not traveling in multiple layers. The wiper rejects parts which are stacked on top of others back into the bowl. Secondly, the wiper rejects parts which are traveling with their long sides standing vertically.

Next comes a pressure break. The function of a pressure break is to keep parts moving up the track even though the discharge track is full. This reduces the amount of pressure on the subsequent orienting tool and reduces the possibility of parts jamming. The pressure break also reduces wear of the bowl tracks, since parts which do not move have a tendency to vibrate back and forth and produce wear on the track. The pressure break may also be used to solve miscellaneous problems such as to reject nesting parts or parts traveling in large groups.

A narrowed track is next encountered which further reduces the number of possible orientations of a part by rejecting all parts whose long dimensions are perpendicular to the bowl wall. When this occurs, a center of gravity of the part causes it to fall back into the bowl. The narrow track also assures that parts are not traveling two abreast.

Following this, a retaining rail is often utilized. There are many variations of the retaining rail when it is used in conventional bowl feeders. In a programmable feeder it is used primarily as a means to retain the correct orientation of the part. Thus if the part loses its orientation, it would mean presenting an incorrect orientation to the discharge track which is likely to cause jamming.

Also, a hold down may be included which operates in a similar manner to the retaining rail with the exception that it prevents parts from being pushed upward and off the track when they are under pressure. Again, without a hold down, parts are inclined to jam.

Another device commonly used in prior art apparatus is a slotted track or a silhouette. A conventional slotted track allows the feeder to orient a wide range of headed parts such as screws, bolts, and any part which will suspend from a larger diameter. A silhouette, on the other hand, can feed parts which have features such as slots or grooves on their perimeters such that parts in an undesired orientation will fall through an opening back into the bowl while a part in the desired orientation will pass over the silhouette to the point of discharge.

Figure 2:
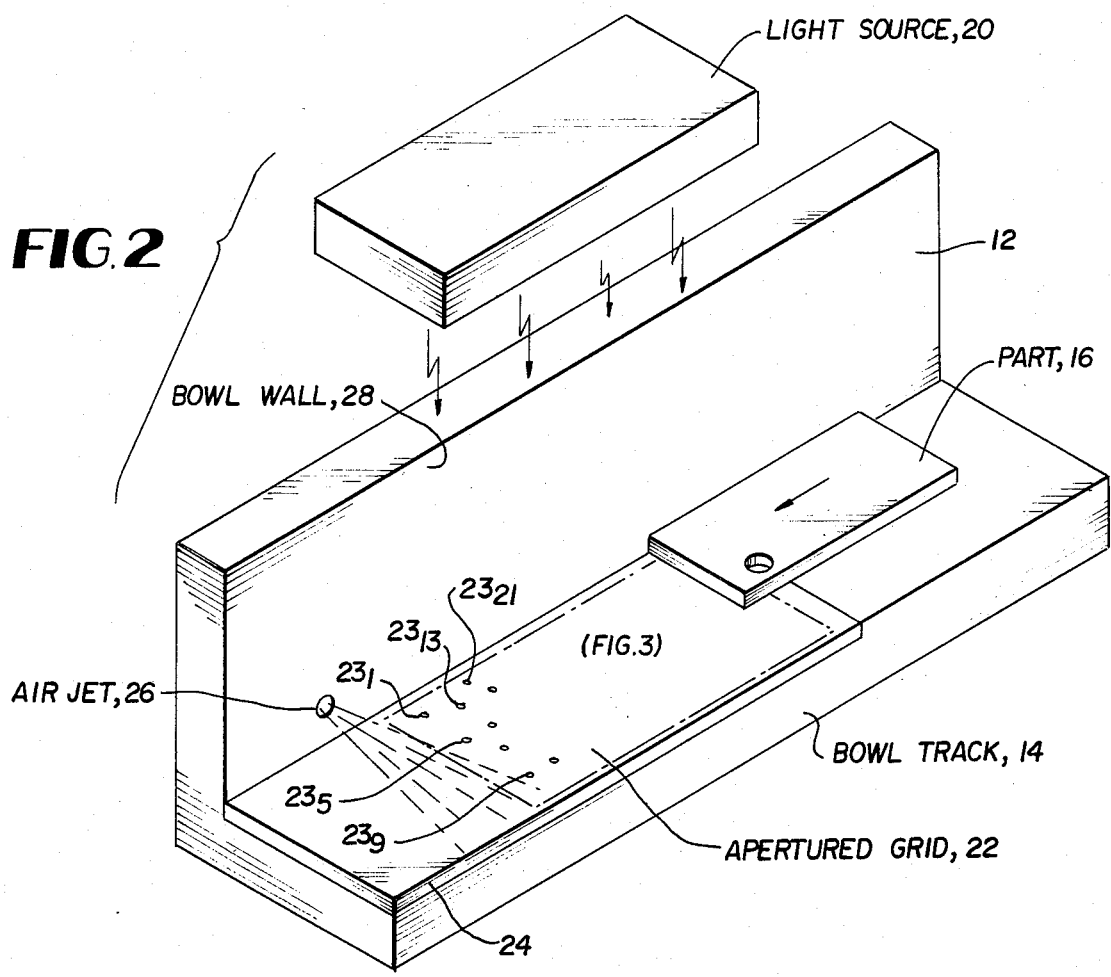
FIG. 2 is a perspective view illustrative of means for sensing a part being fed along a track in the apparatus of FIG. 1.

The present invention, however, deletes the mechanical silhouette, and when desirable one or more of the aforementioned mechanical tooling modules, in favor of a computerized electronic vision system, a portion of which is shown in FIG. 2. Referring now to FIG. 2, a light source 20 is mounted over the bowl 12 and is adapted to provide an elongated illumination of substantially constant brightness downwardly onto the feeder track 14. The section of the feeder track 14 directly beneath the light source 20 includes an apertured grid 22 having a plurality of apertures 23 which comprise thirty two in number. The grid 22 is provided with a transparent covering 24 to provide a continuous sliding surface for parts 16 traveling along the track 14. In the event that a part 16 traversing the grid 22 is the desired part, as will be subsequently explained, and has the proper orientation, an air jet 26 located in the side wall 28 of the bowl 12 will be turned off, permitting the part 16 to pass the grid to a delivery point while an undesired part or one having an improper orientation will be blown off the track 14 back into the bowl.

Figure 3:
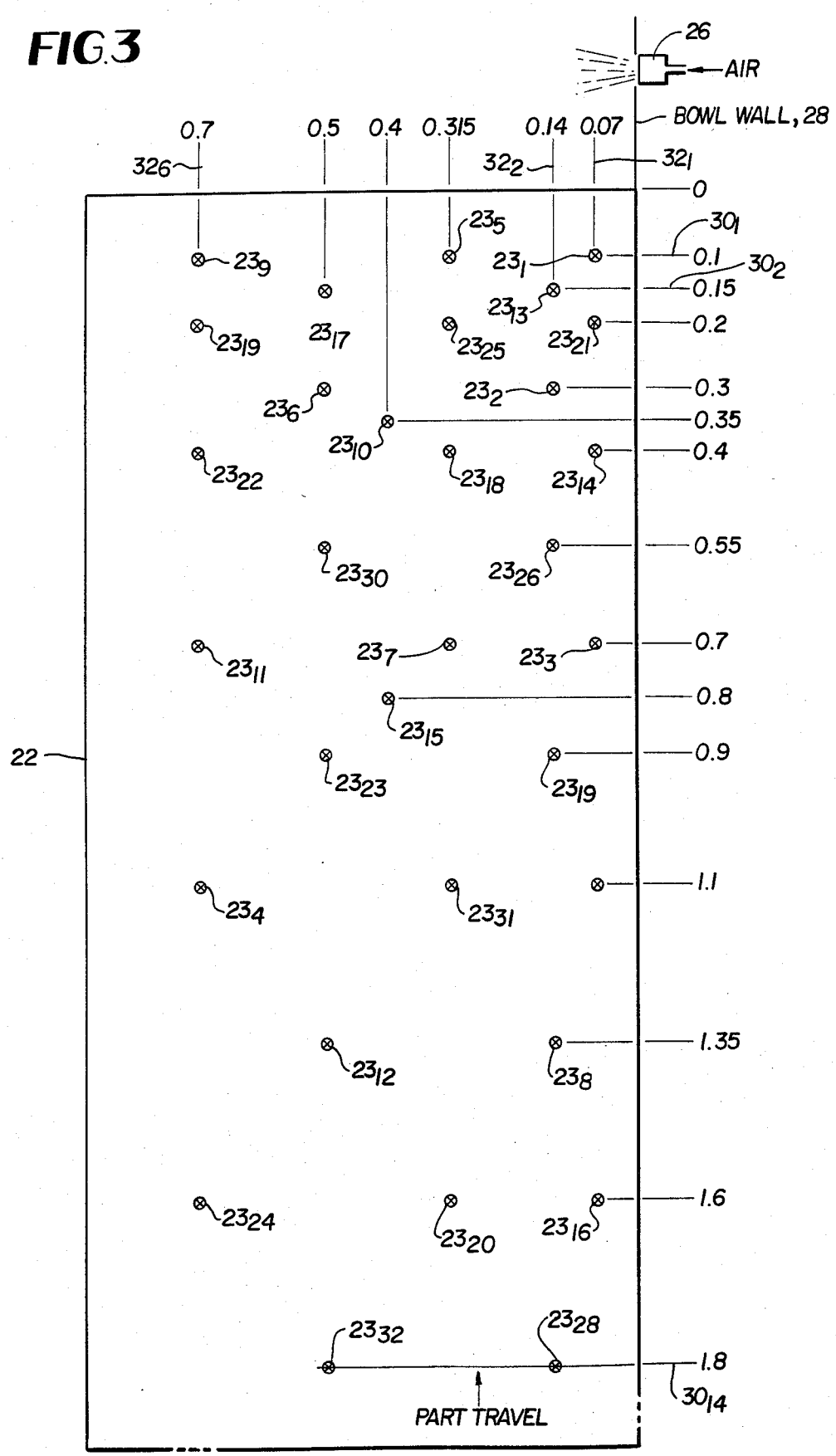
FIG. 3 is a plan view of the apertured grid pattern utilized in the sensor apparatus shown in FIG. 2.

Referring now briefly to FIG. 3, shown thereat is the hole pattern for the thirty two apertures or small light holes $23_1$, $23_2$ ... $23_{32}$ in the grid 22 shown in FIG. 2. The hole positions are further shown having normalized distance dimensions from an origin shown as 0 located prior to the location of the air jet 26. The origin or O position is furthermore coincident with the bowl wall 28. The holes are arranged along fourteen parallel lines $30_1$, $30_2$ ... $30_{14}$ perpendicular to the bowl wall 28 and having distances from the origin corresponding to 0.1, 15, 0.2 ... 0.16 and 1.85 as shown. Moreover, the holes are arranged along six parallel lines $32_1$, $32_2$ ... $32_6$ which are also parallel to the bowl wall 28 and having distances outwardly from the origin corresponding to 0.07, 0.15, ... 0.7.

It can be seen, moreover, by reference to FIG. 3 that part travel begins by passing holes $23_{28}$ and $23_{32}$ and progressing forward until it passes the last three colinear holes $23_1$, $23_5$ and $23_9$. While the arrangement shown in FIG. 3 may appear irregular, it is designed to generate a low resolution digital image with high discriminatory capability for use with a variety of part types which are stored in memory during programming and thereafter used to compare the stored images with a part subsequently appearing thereat during a RUN mode, as will be explained.

Figure 4:
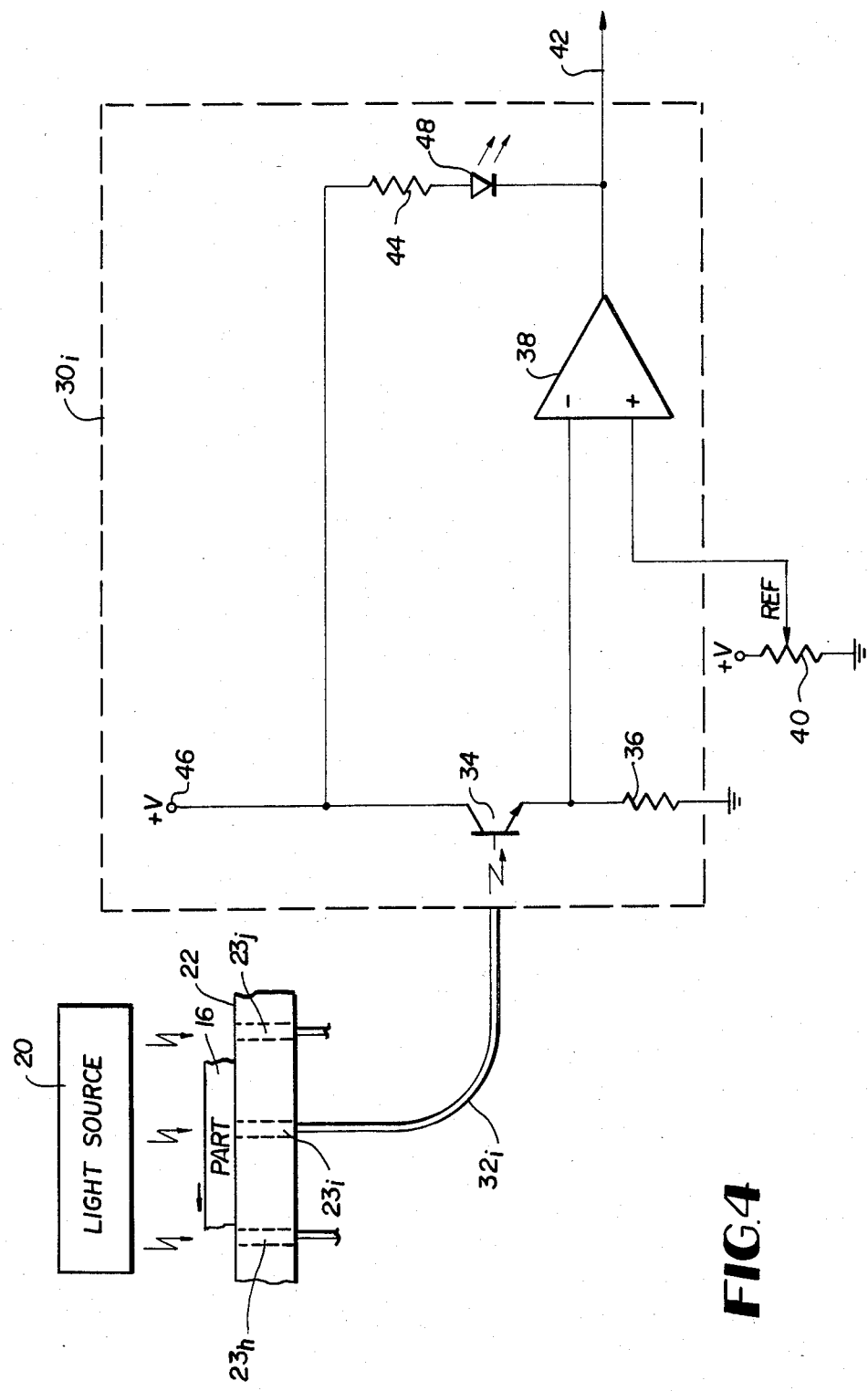
FIG. 4 is a partial schematic diagram illustrative of one light detection circuit of the subject invention.

Each of the holes or apertures $23_1 \ldots 23_{32}$ operate to couple light from the light source 20 to respective fiber optic waveguide elements which in turn couple the light to a sensor comprising a phototransistor in a light detecting or sensor circuit as shown in FIG. 4. Referring now to FIG. 4, a light detection circuit $30_i$ for the $i_{th}$ stage of thirty two identical circuits has a fiber optic guide $32_i$ coupled from the $i_{th}$ aperture $23_i$ of the aperture grid 22 to the base of a phototransistor 34. Each optical signal is carried by fiber optics in order to first, isolate the electronics from the vibration and electrical noise of the feeder, and secondly, to allow a higher pixel density than would be possible if sensors 34 were directly mounted in the grid 22.

The phototransistor 34, as is well known, operates to pass a current as a function of the light intensity incident on its base electrode. This current passes through a resistor 36 coupled to the emitter generating a voltage thereacross which is a function of light intensity. This voltage signal is applied to one side (−) of a comparator circuit 38. The other side (+) of the comparator is coupled to a reference potential established by the setting of a potentiometer 40. The reference potential (REF) permits the threshold of the comparator to be adjusted depending upon the light intensity from the light source 20. The output signal of the comparator appearing on circuit lead 42 is a digital signal which is "high" when the positive input is greater than the negative input and "low" when the reverse is true. A pull-up resistor 44 is coupled between the output line 42 and the +V supply terminal 46 to pull the signal output of the comparator up to TTL levels. In series with the resistor 44 is a light emitting diode (LED) 48 which acts as an indicator light for the output state of the comparator 38. The LED's of the thirty two stages are furthermore arranged in a grid, not shown, for use in programming to allow the user or operator to see the image or shadow of the part 16 presently on the grid 22.

Figure 5:
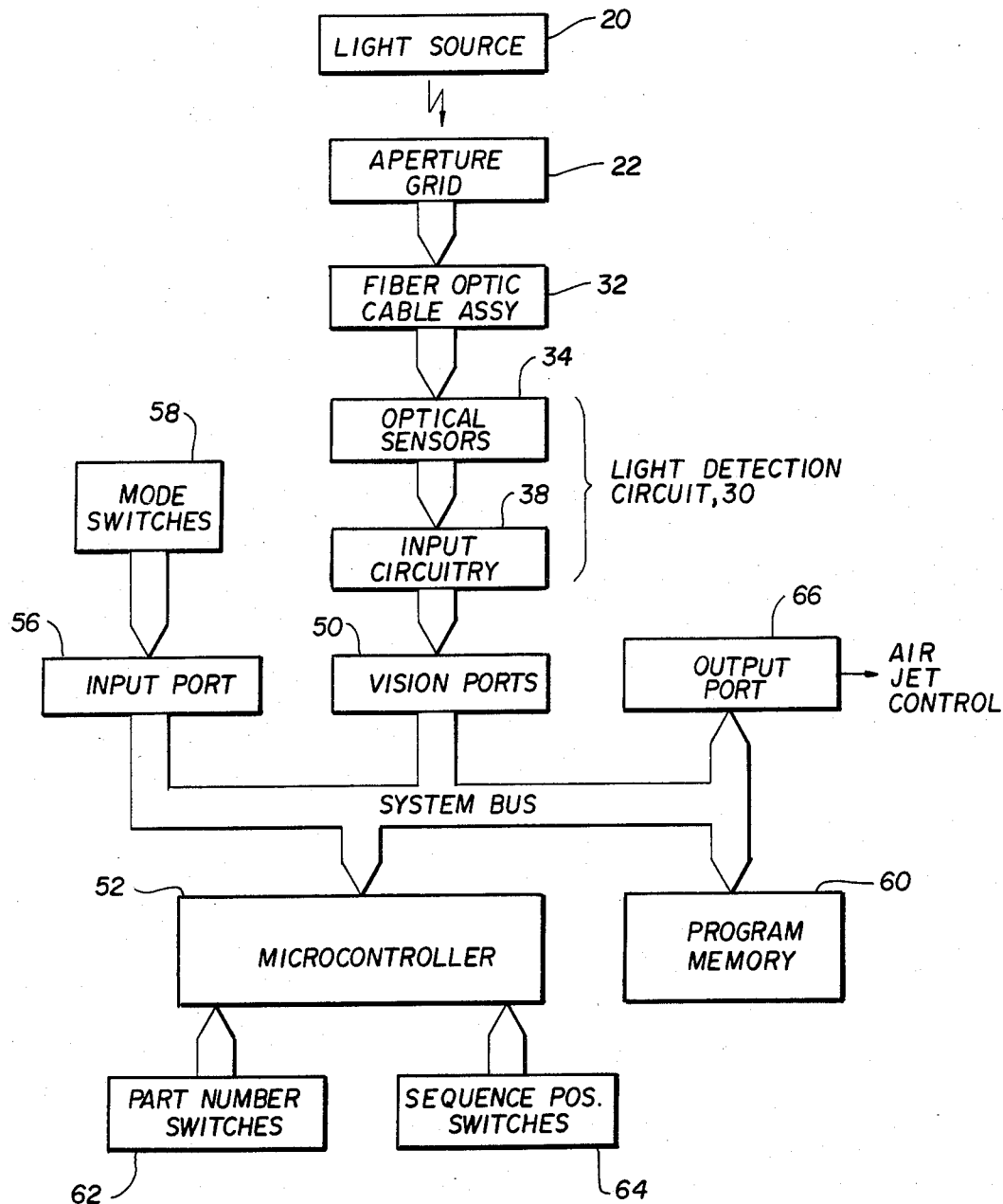
FIG. 5 is a simplified electrical block diagram of the preferred embodiment of the invention.

Prior to considering the details of the invention further, reference will now be made to the block diagram of FIG. 5 which provides an overview of the system hardware. As shown in FIG. 5, the light source 20 directs light upon the apertured grid 22 whereupon optical signals are fed from the grid via the fiber optic cable assembly 32 comprised of guides $32_1 \ldots 32_{32}$ which couple to respective light detection circuits comprised of the sensor circuits $30_1 \ldots 30_{32}$, each including a phototransistor optical sensor 34 coupled to the comparator input circuit 38. Thirty two light detection circuits $30_1 \ldots 30_{32}$ couple to vision ports 50, shown in detail in FIG. 6, which are readable by a micro-controller 52 via a multi-line system bus 54. The bus 54 is also coupled to an input port 56 whereby the micro-controller 52 can read the state of a plurality of user operable mode switches 58 which permits the user to manually select IMAGE, TEST, TIMER and SEQUENCE modes for programming and initiating/terminating the RUN mode. Additionally, the system includes a program memory 60 which is coupled to the system bus 54. The memory 60 operates to feed operating instructions to the micro-controller 52 upon receiving addresses and a control signal $\overline{PSEN}$ from the micro-controller. Also, the micro-controller 52 is coupled to a plurality of part number thumbwheel switches 62 and a plurality of sequence position thumbwheel switches 64 which are user operable so that a particular part type can be identified by number and the part number for each sequence position can also be read into the micro-controller. Up to ten different part numbers can be inputted to the micro-controller 52 while up to ninety-nine different sequence positions can be handled. An output port 66, moreover, is coupled to the system bus 54 for applying a control signal to operate the air jet 26 shown in FIG. 2, allowing either a part to pass or be rejected back into the bowl 12.

Figure 6:
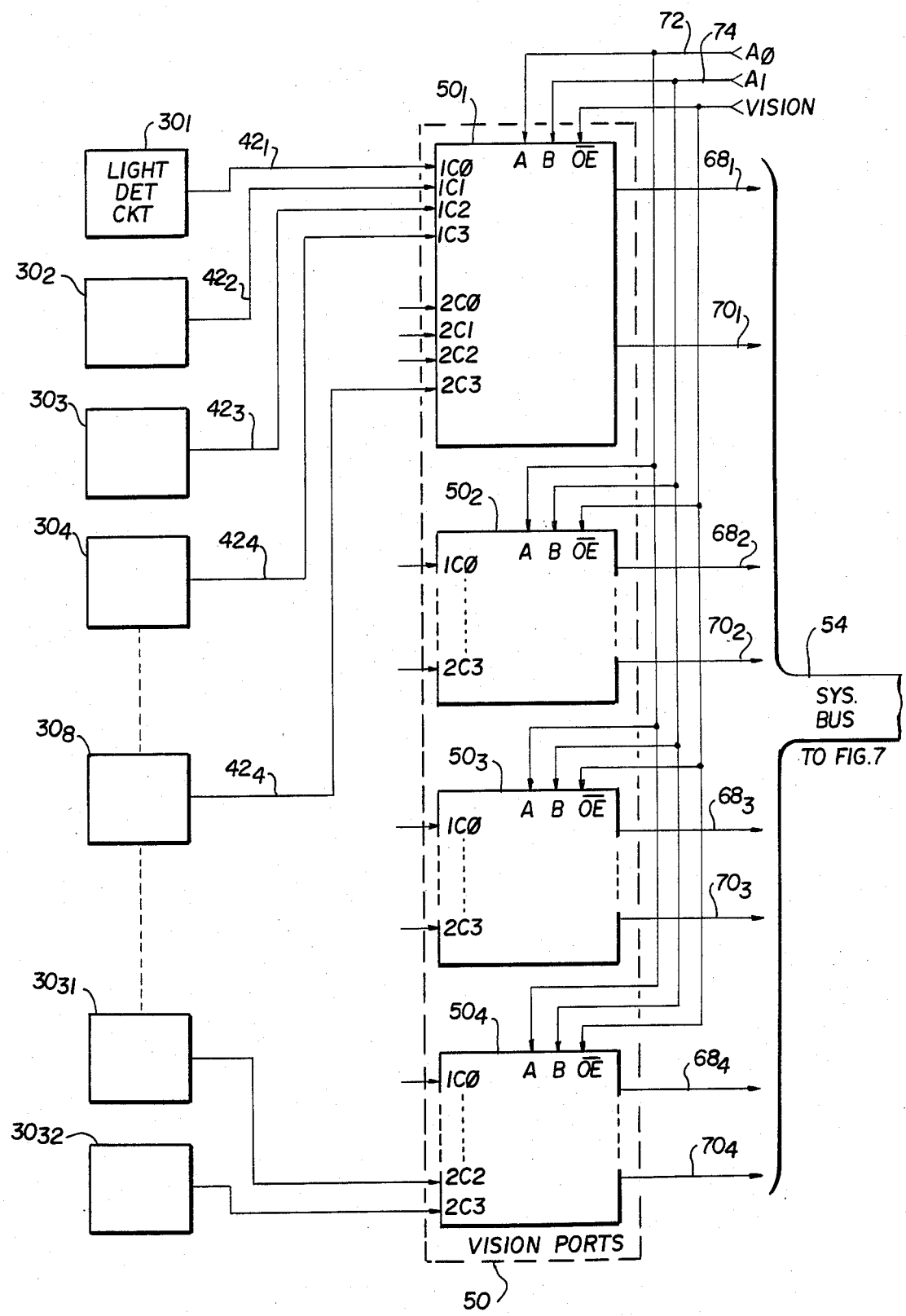
FIG. 6 is an electrical schematic diagram partially illustrative of the preferred embodiment of the invention.

Referring now to FIGS. 6 and 7, disclosed thereat in schematic form is a more detailed diagram of the preferred embodiment of the invention. FIG. 6 shows thirty-two individual sensor or light detector circuits $30_1, 30_2, 30_3 \ldots 30_{31}, 30_{32}$ having their individual output leads $42_1, 42_2 \ldots 42_{32}$ coupled in sets of eight to four vision port devices $50_1, 50_2 50_3$ and $50_4$, each of which is operable to provide two bits of an eight bit vision port 50. Each of the vision port devices $50_1 \ldots 50_4$ comprises a dual 4:1 data selector having two sets of four inputs 1C∅–1C3 and 2C∅–2C3, with the first group of sensor circuits $30_1$ through $30_4$ respectively coupled to the inputs 1C∅, 1C1, 1C2 and 1C3. Light sensor circuits $30_5$ through $30_8$ are connected to inputs 2C∅ through 2C3 for the first data selector device $50_1$ and so on with $30_{32}$ being coupled to 2C3 of vision port $50_4$.

Each data selector, for example, comprises a 74LS253 integrated circuit chip and operates such that when an "active low" signal appears at input $\overline{OE}$, one of the four inputs 1C∅ through 1C3 will be outputted on line 68 depending upon the binary digital logic state of the signals applied to inputs A and B. Simultaneously, one of the inputs 2C∅ through 2C3 will be outputted on line 70. The four binary input states possible on the inputs A and B will output four sets of eight digitized light signals which are applied to the system bus 54 via the lines $68_1, 70_1 \ldots 68_4, 70_4$. Accordingly, the data selector $50_1$ outputs the first two bits of the eight bit vision port 50, while the data selector $50_2$ outputs the third and fourth bits, the data selector $50_3$ outputs the fifth and sixth bits, and the data selector $50_4$ outputs the seventh and eighth bits. Each of the selector elements $50_1, 50_2, 50_3$ and $50_4$ are controlled via A∅ and A1 address lines from a digital address latch 76 shown in FIG. 7 as well as a vision enabling signal line 78 from a port selector device 80 also shown in FIG. 7. The port selector 80 is adapted to provide three enabling signal outputs at 1Y∅, 1Y1, 2Y∅, depending upon the digital state of input signals applied to 1A, 1B, $\overline{1G}$ and 2A, 2B, $\overline{2G}$. Further as shown, the inputs 1A and 2A are commonly coupled to an address line 82 from the address latch 76 while the 1B and 2B inputs are commonly coupled to the address line 84, also from the address latch 76. The $\overline{1G}$ and $\overline{2G}$ inputs are respectively coupled to the $\overline{RD}$ and $\overline{WR}$ outputs of the micro-controller by the lines 86 and 88. Using the "active low" logic convention, which is well known, the micro-controller 52 can enable either the vision ports $50_1 \ldots 50_4$ via line 78, the mode input port 56 via line 90 or can enable the output port 66 via the line 92 and a logic inverter 94.

The port select device 80 actually comprises a dual decoder integrated circuit device typically of the type identified as a 74LS139 semiconductor chip. The mode input port 56, the address latch 76 and the output port 66 are all comprised of 74LS373 eight bit latches with tri-state outputs while the program memory 60 is comprised of an Intel 2716 EPROM memory chip. The micro-controller comprises an Intel 80C40 micro-controller having an internally contained random access memory (RAM) 53.

Further as shown in FIG. 7, the micro-controller 52 communicates with the other components, with the exception of the part number switches 62 and the sequence position switches 64, via an eight bit signal bus 54 consisting of eight signal lines which carry address signals for part of any machine cycle and data at other times in the machine cycle. Thus address signals for the program memory 60 are latched in the address latch 76 which provides outputs on 1Q–8Q and which are coupled to the inputs A$\emptyset$–A10 of the program memory chip 60 along with a three bit signal line 98. The address latch 76 causes address signals to be available to the program memory even when they cease to be present on the data bus 54.

A control program, disclosed in Appendix I attached to this specification, is stored in the EPROM memory 60 which outputs instructions on the 01–07 outputs to the micro-contoller 52 when an "active low" signal is supplied from the $\overline{PSEN}$ output of the micro-controller 52 and commonly applied to the chip select and output enable terminals $\overline{CS}$ and $\overline{OE}$ via line 100. While the part number switch 62 and the sequence position switches 64 are directly coupled to the micro-controller 52 via four bit input lines 102 and eight bit input lines 104 respectively connected to terminals P24–P27 and P1$\emptyset$–P17, the mode switches 58 are coupled to the micro-controller 52 through the system bus 54 and the 1Q–4Q outputs of the mode input port 56 which has its four inputs 1D, 2D, 3D and 4D coupled to lines 106, 108, 110 and 112. These lines are respectively coupled to separate push-button switches, not shown, of the mode switches 58 for providing operator selectivity of an IMAGE mode when an image of a particular part is to be stored, the TIMER mode for determining the time required for a particular part to pass the deactivated air jet area, the TEST mode which is used primarily in conjunction with both the IMAGE and TIMER modes to terminate and test them, and a SEQUENCE mode which is used for programming the feeding of a desired sequence of parts, of like or dissimilar types, on a periodic basis. The mode lines 106, 108, 110 and 112 are further coupled to the interrupt input $\overline{INT}$ of the micro-controller 52 along with the output line 113 of a power off detector 114 via the line 116 and a logic OR circuit consisting of five commonly connected logic inverters 118 through 126. This allows the micro-controller 52 to respond to any one of the five interrupt signals without having to continuously monitor the mode switches 58 or power detector 114 during its normal operation. But once an interrupt is received, it can then read the input port 56 via the system bus 54 for the condition of inputs 1D, 2D, 3D and 4D.

Figure 8D:
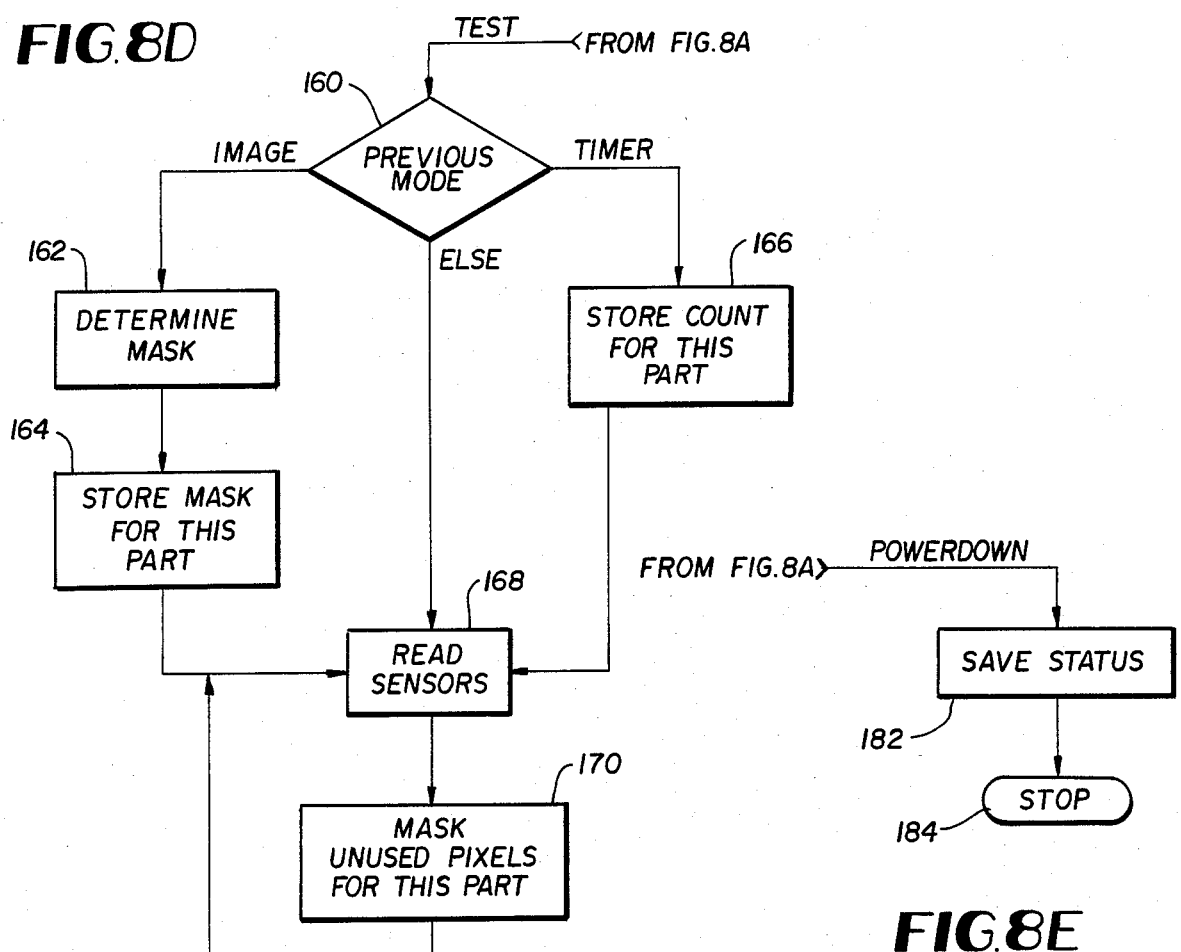

The operation of the preferred embodiment of the invention can further be understood by reference to the flow chart which is depicted in FIGS. 8A through 8F and which is implemented by the stored program (Appendix I) contained in the program memory 60. Referring to FIG. 8A, when power is applied, the micro-controller 52 restores the operational status of the system that was saved at the point of last power removal. This is indicated by step 130. This information, moreover, is stored in the RAM 53 of the micro-controller 52 and which is powered by a battery operated back-up circuit, not shown. If the program that was being executed at power-down was the RUN mode as indicated by step 132, a return is executed as indicated by step 134. This returns the program to that point in the RUN mode which was being executed when the power removal was detected by the detector 114. If the RUN mode was not in progress at power-down, the air jet 26 is turned on to prevent any part passage and the processor goes into an idle state waiting for an interrupt as shown by step 136. Any interrupt signal, be it an "image", "timer", "test", "sequence" or "power-off" interrupt appearing on line 116 causes the micro-controller 52 to branch to this point in the program. This is indicated by reference numeral 138. The air jet 26 is turned on again as indicated by step 140 due to the fact that at the occurrence of the interrupt, the micro-controller 52 does not know which interrupt has occurred. The outputs 1Q–4Q of the mode input port 56 are next read through the system bus 54 to determine which of the four mode interrupts has occurred, if any. This is indicated by step 142-1 and 142-2. As can be seen, the power down signal does not appear on the system bus 54.

If an "image" interrupt has occurred indicating that an operator programmer has activated the IMAGE mode for storing the shadow image of a part currently in position on the apertured grid 22, the micro-controller 52 outputs a READ signal from $\overline{RD}$ on line 86 to the port selector input $\overline{IG}$ in conjunction with appropriate address signals on lines 82 and 84 whereupon the vision enable line 78 sends an enabling signal to the vision ports 50 comprised of the elements $50_1$, $50_2$, $50_3$ and $50_4$, causing the light sensor circuits $30_1$, $30_2$ ... $30_{32}$ to be read (step 144), eight bits at a time in four reads, via the signal lines $68_1$, $70_1$ ... $68_4$, $70_4$ and the system bus 54. A part number for that particular part is also selected on the part number switches 62 and the image is stored in the memory 53 at the location associated with the part number (step 146). The micro-controller 52 will continue to loop, reading the sensors, storing the information until another interrupt occurs. This involves use of the "test" interrupt which will be discussed subsequently. At that point, image information for that part remains in the memory 53 for future use.

If a "timer" interrupt occurs by the operator activating the timer mode switch of the mode switches 58, indicating that it is desired to set the time interval that the air jet 26 is to be turned off in order to allow a correctly oriented part to go by and pass out of the bowl, the micro-controller 52 again outputs an "active low" signal on $\overline{RD}$ to the READ line 86 and the appropriate address causing the port selector 80 to output an enabling signal on the 1Y1 output which is coupled to the $\overline{OE}$ input of the vision ports that again reads the outputs from the light detector circuits $30_1$ ... $30_{32}$ via the eight vision port output lines $68_1$, $70_1$ ... $68_4$, $70_4$. This is indicated by step 148 of FIG. 8C. Next the micro-controller 52 masks the unused sensor elements 34 (FIG. 4) in light detecting circuits $30_1$ ... $30_{32}$ for that part imaged and identified by the part number set on the part number switch 62 and compares the resulting image with the image stored (step 152). If there is not a match, the micro-controller 52 will continue to loop reading the light detector sensors, masking and comparing until a match occurs. At that point, the air jet 26 is turned off as evidenced by step 154 and a software counter in the micro-controller 52 is set to zero and is thereafter incremented until an interrupt occurs as shown by steps 156 and 158. The interrupt normally used to terminate the TIMER mode is the "test" interrupt which will now be considered.

Referring now to FIG. 8D, user activation of the TEST push-button of the mode switches 58 causes the "test" interrupt signal to be generated. When this occurs, the first step made is to test the previous mode as indicated by reference numeral 160. If the previous mode was the IMAGE mode, meaning that that particular part image is to be stored, a mask is determined that will mask off the unused or unnecessary light detecting elements (pixels). This is shown by step 162. Masking unused pixels prevents confusion between successive parts arriving at the grid 22. Determination of the mask is based on the knowledge of what the grid pattern (FIG. 3) looks like and what light detector elements $30_1 \ldots 30_{32}$ for the grid pattern are not necessary for an evaluation of a particular part. The mask for a particular part is stored in the RAM memory 53 at a location associated with the respective part number. If, on the other hand, the previous mode had been the TIMER mode, the count that had been accumulated in step 158 of FIG. 8C is stored in the RAM 53 per step 166. This number will be used later as the time-out period for that particular part passing the air jet 26 in its proper orientation. At this point the TEST mode will cause the test loop to again cause the micro-controller 52 to read the sensors, mask the unused pixels for the part indicated by the part number switch 62 and check the resulting image to determine whether it is the desired image or not. This is evidenced by steps 168, 170 and 172. If the desired image is present, at that point the air jet 26 is turned off (step 174) and the timer count is decremented until it reaches zero, at which point the air jet 26 is turned back on and the sensors are again read looking for the next part in the desired orientation. This is shown by steps 176, 178 and 180. The test loop furthermore allows the input for any particular part numbers to be verified to make sure that it is functioning as desired.

Figure 8E:
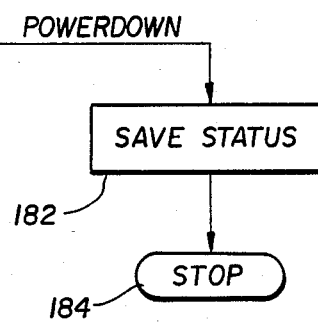

If the interrupt comprises a "power-down" interrupt occurring as a result of the detector 114 generating an interrupt signal which is applied to line 115 of FIG. 7, the status of the micro-controller 52 is saved in the RAM 53 and the processor is stopped at that point and waits for the next power-up cycle. This is shown in FIG. 8E as steps 182 and 184.

Figure 8F:
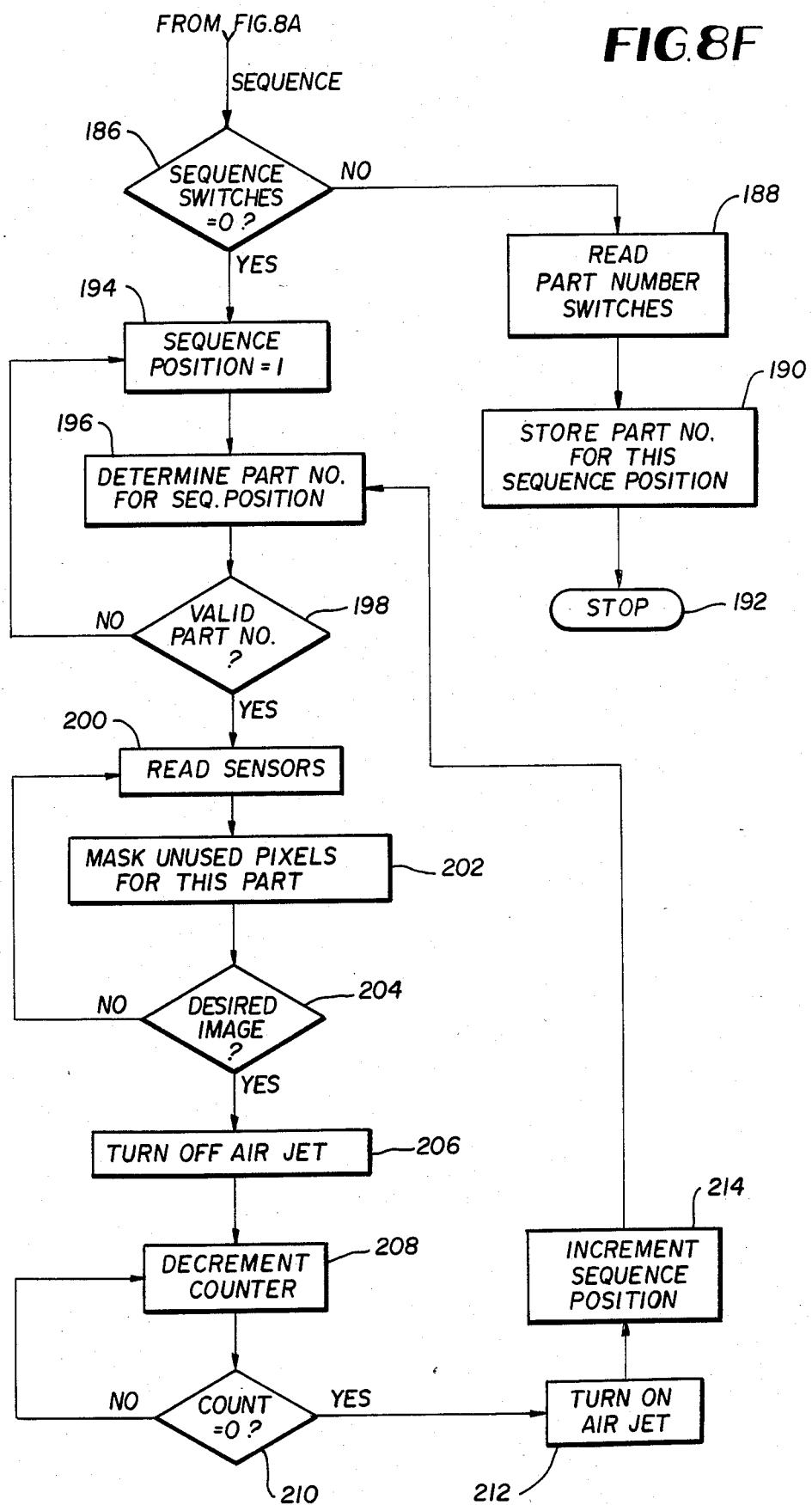

The remaining mode comprises the SEQUENCE mode and is activated by one of the mode switches 58 and causes an interrupt signal to be sent to the micro-controller 52 via lines 112 and 116. The "sequence" interrupt can serve two functions depending upon the value of the sequence position switches 64. Referring now to FIG. 8F, if the sequence position switches 64 are all set to zero, it signifies that the system is to go into the parts feeding RUN mode. If the sequence positions are not zero, the part number switches 62 are read by the micro-controller 52 and that part number is stored for the sequence position set on the position switches 64. The part number is stored in the RAM 53 for that sequence position after which the micro-controller is stopped awaiting the next interrupt. This operation is indicated by steps 186 through 192. In the event that the sequence positions of the switches 64 are set to zero indicating a RUN mode, the micro-controller 52 will index through all of the part numbers of a sequence in the following manner.

The sequence position is first set to No. 1 as shown by step 194. A look-up table in the micro-controller 52 is referenced to determine what part number is to be fed for the first sequence position (step 196). The part number is next checked to insure that it is a valid part number per step 198. An invalid part number indicates an end of a sequence and when encountered, the sequence is started again by returning to step 194 which is the first sequence position i.e. position number 1. Assuming that a valid part number is found, the light detector sensors are read and the previously generated mask for that particular part number is retrieved from the RAM 53. The resulting image is compared for the desired image for the part desired at that point in the sequence. This is evidenced by reference numerals 202 and 204. If there is no match, the program loops back to step 200 and continues until the desired image match is encountered, at which point the air jet 26 is turned off per step 206 and thereafter the software counter is decremented to zero (step 208). At the zero count, the air jet is turned back on in accordance with steps 210 and 212, at which point the sequence position is incremented to the next position, e.g. position number 2, followed by position number 3, etc. This is shown by step 214 and a return is made to step 196 where the look-up table is again accessed to determine the part number for the next sequence position. This permits the same or different parts to be fed for any position of a sequence. Thus, where for example parts A, B and C are contained in the bowl feeder 10, any sequence of parts A, B and C can be fed to the feeder output. A typical sequence might consist of part A followed by part B, followed by another part B, followed by another part A, followed by part C, after which time a new cycle of the same sequence is repeated. The program is accordingly continually looped until it is terminated by another interrupt.

Thus the progxamming of the part feeder comprises a two step process. First the image and timing for each part type are programmed into the micro-controller 52 by generating an image interrupt followed by a test interrupt and a timer interrupt followed by a test interrupt as indicated in FIG. 8D, per steps 160 through 166. Secondly, a part sequence is next programmed per steps 186 through 192 of FIG. 8F. These steps are independent such that the sequence can be reprogrammed without reprogramming the part number information. Likewise, individual part numbers can be reprogrammed without changing the sequence and enables correction of the programming of an individual part upon demand.

A programming sequence for a part normally proceeds as follows. The operator presses the image push-button switch of the mode switches 58 and then places a part on the grid 22 with the feeder turned off such that a unique shadow image is generated via the light detector circuits $30_1, 30_2 \ldots 30_{32}$. Next the operator normally presses the test push-button of the mode switches 58, thereby generating a test interrupt. This will cause the image which has been generated to generate a mask which is then stored for that particular part. Next the feeder is turned on and the timer push-button of the mode switches 58 is pressed. The same part having a correct orientation is then made to traverse the grid 22. When the part is recognized, the air jet 26 will be turned off and after the part passes the air jet 26 the operator programming the system presses the test push-button which causes a count that has been accumulated to be stored for that part. This is repeated for each different part. If the generation and storing of part masks are not desired, part images alone are generated and stored by terminating the IMAGE mode by means of an interrupt other than the test interrupt, such as the timer interrupt.

The programmer can then program a particular part sequence if desired. Programming a part sequence is relatively simple. Starting with the first sequence position, the sequence switches 64 are set to No. 1. The desired part number for that position is next set on the part number switches 62 and the sequence push-button of the mode switches 58 is activated. This causes the part number to be stored for that sequence position and causes an invalid part number to be placed in the next sequence position, indicating the end of a sequence. If an additional sequence position is desired, the second sequence position switches will be set to No. 2. The corresponding part number is set into memory when the part number switches 62 and the sequence button again is pressed. The procedure is repeated for as many sequence positions as are desired. Again as each sequence position is programmed, the next sequence position is set to an invalid part number indicating the end of the programmed sequence. When the sequence switches 64 are thereafter set to zero and the sequence mode button is again pushed, the system is caused to enter the RUN mode and will go through the programmed feeding sequence on a continual basis until another interrupt is received.

Thus what has been shown and described is a part feeder including a high speed vision system which cannot only orient parts, but sort and orient parts from a mixed batch in a predetermined sequence. Thus the system can feed a variety of parts to an assembly operation in a sequence that is required, for example, by a robotic assembly operation or other flexible automated assembly apparatus and accordingly allow one piece of apparatus to replace any number of dedicated part feeders.

Having thus shown and described what is at present considered to be the preferred embodiment of the invention, it should be noted that the same has been made by way of illustration and not limitation. Accordingly, all modifications, alterations and changes coming within the scope of the invention as defined in the appended claims are herein meant to be included. For example, programmed time intervals for the deactivation and turn-on of the air jet may be deleted in favor of a part sensor located beyond or downstream of the location of the air jet and which operates to turn the air jet on again once the desired part has passed the deactivated air jet.

APPENDIX I

```
              JMP     START       ;JUMP TO POWER ON START

IDL

;INTERRUPT ENTRY

SEL     RB0         ;USE REGISTER BANK 0

MOV     R6,A        ;SAVE A IN R6

MOV     R1,#0       ;POINT AT OUTPUT PORT

MOV     A,#1        ;SETUP TO TURN AIR JET ON

MOVX    @R1,A       ;TURN AIR JET ON

INTO:         MOVX    A,@R1       ;READ MODE PORT

ANL     A,#0FH      ;MASK THE HIGH ORDER NIBBLE

JZ      POWER       ;JUMP IF POWER FAILURE

CLR     F0          ;CLEAR RUN FLAG

CLR     F1          ;CLEAR SECOND TRY FLAG

MOV     R6,A        ;TEMP STORAGE

MOV     A,#0        ;CLEAR STACK

MOV     PSW,A

MOV     A,R6        ;RESTORE A

JB2     TEST        ;JUMP IF TEST MODE
```

```
            MOV     R7,A        ;SAVE MODE IN R7
            JB0     IMAGE       ;JUMP IF IMAGE MODE
            JB1     TIME        ;JUMP IF TIMER MODE
;
;OTHERWISE SEQUENCE MODE
;
            IN      A,P1        ;READ SEQUENCE NUMBER
            JZ      RUN         ;0=RUN MODE
;CONVERT BCD SEQUENCE NUMBER TO HEX
            MOV     R2,A        ;STORE BCD NUMBER IN R2
            ANL     A,#0F0H     ;MASK LOW ORDER NIBBLE
            SWAP    A           ;SWAP NIBBLES
            RL      A           ;X2
            MOV     R3,A        ;STORE 2X HIGH ORDER DIGIT
            RL      A           ;X4
            RL      A           ;X8
            ADD     A,R3        ;X10
            MOV     R3,A        ;STORE CONVERTED DIGIT
            MOV     A,R2        ;GET LOW ORDER DIGIT
            ANL     A,#0FH
            ADD     A,R3        ;COMPLETE CONVERSION
            ADD     A,#SEQTAB-1 ;POINT INTO SEQUENCE TABLE
            MOV     R0,A        ;POINTER TO R0
            IN      A,P2        ;READ PART NUMBER
            SWAP    A           ;PUT IT IN LOW ORDER NIBBLE
            ANL     A,#0FH      ;MASK HIGH ORDER NIBBLE
            MOV     @R0,A       ;PUT PART NUMBER IN SEQ. TABLE
            INC     R0          ;PUT EOT MARKER IN SEQ. TABLE
            MOV     @R0,#0FFH
            CALL    DEBON       ;SOFTWARE SWITCH DEBOUNCE
```

```
            IDL                ;WAIT FOR MEXT INTERRUPT
;
;RUN MODE
;
RUN:    CALL    DEBON       ;SOFTWARE SWITCH DEBOUNCE
        CPL     F0          ;SET RUN FLAG
RUN1:   MOV     R2,#SEQTAB-1 ;POINT AT SEQUENCE TABLE
RUN2:   INC     R2          ;POINT AT NEXT SEQ. POSITION
        MOV     A,R2        ;POINTER TO R0
        MOV     R0,A
        MOV     A,@R0       ;PART NUMBER TO A
        JB7     RUN1        ;CHECK FOR EOT MARKER
        CALL    MONITOR     ;LOOK FOR PART
        CALL    TIMER       ;TIME JET OFF
        JMP     RUN2        ;DO NEXT PART
;
;TEST MODE
;
TEST:   MOV     A,R7        ;GET PREVIOUS MODE
        JB0     TEST0       ;JUMP IF WAS IMAGE MODE
        JB1     TEST1       ;JUMP IF WAS TIMER MODE
TEST2:  MOV     R7,#4       ;SET PREVIOUS MODE TO TEST
        CALL    DEBON       ;SOFTWARE SWITCH DEBOUNCE
TEST3:  IN      A,P2        ;READ PART NUMBER
        SWAP    A           ;PUT IT IN LOW ORDER NIBBLE
        ANL     A,#0FH      ;MASK HIGH ORDER NIBBLE
        CALL    MONITOR     ;LOOK FOR PART
        CALL    TIMER       ;TIME JET OFF
        JMP     TEST3       ;LOOP TIL INTERRUPTED
;DETERMINE MASK
TEST0:  CALL    PART        ;GET PART TABLE POINTER
```

```
        ADD     A,#6       ;POINT AT FOURTH PORT DESIRED IMAGE
        MOV     R0,A       ;POINTER TO R0
        MOV     A,@R0      ;FOURTH PORT DESIRED IMAGE TO A
        DEC     R0         ;POINT AT FOURTH PORT MASK
        JZ      TEST4      ;JUMP IF FOURTH PORT DESIRED IMAGE = 0
        ANL     A,#7FH     ;MASK BIT FROM 4TH ROW FROM END
        JNZ     TEST2      ;IF STILL NOT ZERO, CAN'T MASK
TEST5:  MOV     @R0,#0FCH  ;UPDATE MASK
        JMP     TEST2      ;FINAL MASK
TEST4:  DEC     R0         ;POINT AT THIRD PORT DESIRED IMAGE
        MOV     A,@R0      ;THIRD PORT DESIRED IMAGE TO A
        INC     R0         ;POINT AT FOURTH PORT MASK
        JZ      TEST6      ;JUMP IF THIRD PORT DESIRED IMAGE = 0
        JB0     TEST5      ;JUMP IF 4TH ROW FROM END CONTAINS A 1
        JB1     TEST5
        MOV     @R0,#0E0H  ;UPDATE FOURTH PORT MASK
        JB2     TEST2      ;DONE IF 5TH ROW FROM END CONTAINS A 1
        JB3     TEST2
        MOV     @R0,#80H   ;OTHERWISE SET FINAL MASK
        JMP     TEST2
TEST6:  MOV     @R0,#0     ;MASK ENTIRE FOURTH PORT
        DEC     R0         ;POINT AT THIRD PORT MASK
        DEC     R0
        MOV     @R0,#0FCH  ;SET THIRD PORT MASK
        DEC     R0         ;POINT AT SECOND PORT DESIRED IMAGE
        MOV     A,@R0      ;SECOND PORT DESIRED IMAGE TO A
        INC     R0         ;POINT AT THIRD PORT MASK
        JZ      TEST7      ;JUMP IF SECOND PORT DESIRED IMAGE = 0
        JB0     TEST2      ;DONE IF 8TH ROW FROM END CONTAINS A 1
        JB1     TEST2
        MOV     @R0,#0F0H  ;OTHERWISE UPDATE MASK
```

|        |       |              |                                         |
|--------|-------|--------------|-----------------------------------------|
|        | ANL   | A,#1CH       | ;CHECK 9TH ROW FROM END FOR 1'S         |
|        | JNZ   | TEST2        | ;DONE IF ANY 1'S                        |
|        | MOV   | @R0,#0       | ;OTHERWISE MASK ENTIRE THIRD PORT       |
|        | JMP   | TEST2        | ;FINAL MASK                             |
| TEST7: | MOV   | @R0,#0       | ;MASK ENTIRE THIRD PORT                 |
|        | DEC   | R0           | ;POINT AT SECOND PORT MASK              |
|        | DEC   | R0           |                                         |
|        | MOV   | @R0,#0FCH    | ;SET SECOND PORT MASK                   |
|        | DEC   | R0           | ;POINT AT FIRST PORT DESIRED IMAGE      |
|        | MOV   | A,@R0        | ;FIRST PORT DESIRED IMAGE TO A          |
|        | INC   | R0           | ;POINT AT SECOND PORT MASK              |
|        | ANL   | A,#7         | ;MASK ALL BUT LAST 3 BITS OF IMAGE      |
|        | JNZ   | TEST2        | ;FINAL MASK IF ANY 1'S                  |
|        | MOV   | @R0,#0C0H    | ;OTHERWISE UPDATE FINAL MASK            |
|        | JMP   | TEST2        |                                         |

;STORE TIMER COUNT

|        |       |        |                                         |
|--------|-------|--------|-----------------------------------------|
| TEST1: | CALL  | PART   | ;GET PART TABLE POINTER                 |
|        | ADD   | A,#7   | ;POINT AT HIGH ORDER BYTE OF COUNTER    |
|        | SEL   | RB1    | ;SWITCH REGISTER BANKS                  |
|        | MOV   | R0,A   | ;POINTER TO R0                          |
|        | MOV   | A,R6   | ;HIGH ORDER BYTE OF COUNTER TO A        |
|        | MOV   | @R0,A  | ;HIGH ORDER BYTE OF COUNTER TO PART TABLE |
|        | INC   | R0     | ;POINT AT LOW ORDER BYTE OF COUNTER     |
|        | MOV   | A,R7   | ;LOW ORDER BYTE OF COUNTER TO PART TABLE |
|        | MOV   | @R0,A  |                                         |
|        | SEL   | 0      | ;BACK TO ORIGINAL  ISTER BANK           |
|        | JMP   | TEST2  | ;DONE SAVING COUNTER                    |

;
;IMAGE MODE
;

|        |      |       |                          |
|--------|------|-------|--------------------------|
| IMAGE: | CALL | DEBON | ;SOFTWARE SWITCH DEBOUNCE |

```
IMAGE0:  CALL    PART     ;GET PART TABLE POINTER
         MOV     R1,#80H  ;LOAD POINTER TO VISION PORTS
         MOVX    A,@R1    ;READ FIRST PORT IMAGE
         MOV     @R0,A    ;STORE IT IN PART TABLE
         MOV     R2,#3    ;LOAD COUNTER FOR OTHER 3 PORTS
IMAGE1:  INC     R0       ;UPDATE TABLE POINTER
         MOV     @R0,#0FFH ;CLEAR MASK
         INC     R0       ;UPDATE TABLE POINTER
         INC     R1       ;POINT AT NEXT VISION PORT
         MOVX    A,@R1    ;READ NEXT VISION PORT
         MOV     @R0,A    ;STORE IT IN PART TABLE
         DJNZ    R2,IMAGE1 ;LOOP TIL ALL VISION PORTS DONE
         JMP     IMAGE0   ;LOOP TIL INTERRUPTED
;
;TIMER MODE
;
TIME:    CALL    PART     ;GET PART TABLE POINTER
         CALL    DEBON    ;SOFTWARE SWITCH DEBOUNCE
         CALL    MONITOR  ;LOOK FOR PART
         SEL     RB1      ;USE REGISTER BANK 1
         MOV     R6,#0    ;INITIALIZE COUNTER TO ZERO
         MOV     R7,#0
TIME0:   MOV     R1,#0    ;LOAD DELAY LOOP COUNTER
TIME1:   DJNZ    R1,TIME1 ;DELAY LOOP
         INC     R7       ;INCREMENT LOW ORDER BYTE OF COUNTER
         MOV     A,R7     ;SEE IF R7=0
         JNZ     TIME0    ;IF NOT, LOOP
         INC     R6       ;IF SO, INCREMENT HIGH ORDER COUNTER
         MOV     A,R6     ;SEE IF R6=0
         JNZ     TIME0    ;IF NOT, LOOP UNTIL INTERRUPTED
```

```
            MOV      #0FFH      ;IF SO, COUNTER   RFLOW
            MOV      R7,#0FFH   ;SET COUNTER TO MAX COUNT
            IDL                 ;AND WAIT FOR AN INTERRUPT
;
;POWER FAILURE MODE
;
POWER:      JTO      PF         ;JUMP IF POWER FAILURE VERIFIED
            CPL      F1         ;SET UP FOR A SECOND TRY
            JF1      INTO       ;IF NOT VERIFIED TRY A SECOND TIME
;POWER FAILURE UNVERIFIBLE IF HERE--FORGET IT
            MOV      A,R6       ;RESTORE A
            MOV      R1,#81H    ;R1 POINTING AT SECOND VISION PORT
            RETR                ;RETURN FROM INTERRUPT
;POWER FAILURE VERIFIED
PF:         CLR      F1         ;CLEAR SECOND TRY FLAG
            MOV      A,PSW      ;SAVE PSW
            MOV      R7,A
            MOV      A,R6       ;RESTORE A
            MOV      R1,#81H    ;R1 POINTING AT SECOND VISION PORT
PF0:        JTO      PF0        ;LOOP IF STILL POWER FAILURE
            RETR                ;RETURN IF RECOVER FROM POWER FAILURE
;
;START
;
START:      MOV      A,R7       ;RESTORE PSW
            MOV      PSW,A
            EN       I          ;ENABLE INTERRUPTS
            JF0      START0     ;JUMP IF IN RUN MODE AT POWER FAILURE
;OTHERWISE TURN AIR JET ON AND WAIT FOR INTERRUPT
            MOV      R1,#0      ;POINT AT OUTPUT PORT
            MOV      A,#1       ;SETUP TO TURN AIR JET ON
```

```
            MOVX      @R1,A     ;TURN AIR JET ON
            IDL                 ;WAIT FOR INTERRUPT
;RETURN TO RUN MODE
START0:     MOV       A,R6      ;RESTORE A
            RETR
;SUBROUTINE       NITOR
;INPUTS:    PART NUMBER IN A
;OUTPUTS:   R6´=HIGH ORDER BYTE OF COUNTER
;           R7´=LOW ORDER BYTE OF COUNTER
;CALLS:     ADDRESS, MATCH
;DESCRIPTION:  MONITOR LOADS THE REGISTERS FOR THE DESIRED PART,
;              MONITORS THE PART FLOW UNTIL THE DESIRED PART IMAGE
;              IS LOCATED, TURNS OFF THE AIR JET, WAITS UNTIL THE
;              DESIRED PART IMAGE IS GONE AND RETURNS.
;
MONITOR:  CALL    ADDRESS  ;CALCULATE PART TABLE POINTER
;LOAD PART DATA INTO REGISTERS
            MOV       R3,@R0    ;LOAD FIRST PORT DESIRED IMAGE
            INC       R0        ;UPDATE POINTER
            MOV       R4,@R0    ;LOAD SECOND PORT MASK
            INC       R0        ;UPDATE POINTER
            MOV       R5,@R0    ;LOAD SECOND PORT DESIRED IMAGE
            INC       R0        ;UPDATE POINTER
            MOV       A,R0      ;STORE POINTER IN A
            MOV       R0,#80H   ;LOAD FIRST VISION PORT ADDRESS
            MOV       R1,#81H   ;LOAD SECOND VISION PORT ADDRESS
            SEL       RB1       ;SWITCH REGISTER BANKS
            MOV       R0,A      ;POINTER TO R0
            MOV       R2,@R0    ;LOAD THIRD PORT MASK
            INC       R0        ;UPDATE POINTER
            MOV.      R3,@R0    ;LOAD THIRD PORT DESIRED IMAGE
```

```
            INC     R0          ;UPDATE POINTER
            MOV     R4,@R0      ;LOAD FOURTH PORT MASK
            INC     R0          ;UPDATE POINTER
            MOV     R5,@R0      ;LOAD FOURTH PORT DESIRED IMAGE
            INC     R0          ;UPDATE POINTER
            MOV     R6,@R0      ;LOAD HIGH ORDER BYTE OF COUNTER
            INC     R0          ;UPDATE POINTER
            MOV     R7,@R0      ;LOAD LOW ORDER BYTE OF COUNTER
            MOV     R0,#82H     ;LOAD THIRD VISION PORT ADDRESS
            MOV     R1,#83H     ;LOAD FOURTH VISION PORT ADDRESS
            SEL     RB0         ;SWITCH BACK TO REGISTER BANK 0
;MONITOR PART FLOW
MON2:       CALL    MATCH       ;CHECK FOR DESIRED IMAGE
            JNZ     MON2        ;LOOP UNTIL DESIRED IMAGE
            MOV     R0,#0       ;POINT AT OUTPUT PORT
            MOV     A,#0        ;PREPARE TO TURN AIR JET OFF
            MOVX    @R0,A       ;TURN IT OFF
            MOV     R0,#80H     ;LOAD FIRST VISION PORT ADDRESS
MON3:       CALL    MATCH       ;CHECK IMAGE
            JZ      MON3        ;LOOP UNTIL NO LONGER DESIRED IMAGE
            RET                 ;THEN RETURN
;
;SUBROUTINE      PART
;INPUTS:    NONE
;OUTPUTS:   POINTER TO PART TABLE IN A & R0
;CALLS:     NOTHING
;DESCRIPTION:    PART READS THE PART NUMBER SWITCH AND CALCULATES
;                THE CORRESPONDING PART TABLE ADDRESS.
;
PART:       IN      A,P2        ;READ PART NUMBER
            SWAP    A           ;PUT IT IN LOW ORDER NIBBLE
```

```
            ANL       A,#0FH    ;MASK HIGH ORDER NIBBLE
;ADDRESS COMPUTES THE TABLE ADDRESS FOR THE PART NUMBER IN A.
ADDRESS: MOV       R0,A      ;PART NUMBER TO R0
         RL        A         ;X2
         RL        A         ;X4
         RL        A         ;X8
         ADD       A,R0      ;X9
         ADD       A,#PARTTAB ;ADD STARTING ADDRESS OF TABLE
         MOV       R0,A      ;POINTER TO R0
         RET
;
;SUBROUTINE    MATCH
;INPUTS:    R0=FIRST VISION PORT ADDRESS
;           R1=SECOND VISION PORT ADDRESS
;           R3=FIRST PORT DESIRED IMAGE
;           R4=SECOND PORT MASK
;           R5=SECOND PORT DESIRED IMAGE
;           R0´=THIRD VISION PORT ADDRESS
;           R1´=FOURTH VISION PORT ADDRESS
;           R2´=THIRD PORT MASK
;           R3´=THIRD PORT DESIRED IMAGE
;           R4´=FOURTH PORT MASK
;           R5´=FOURTH PORT DESIRED IMAGE
;OUTPUTS:   IF MATCH, A=0; OTHERWISE NO MATCH
;CALLS:     NOTHING
;DESCRIPTION: MATCH CHECKS THE CURRENT IMAGE TO DETERMINE
;             IF IT IS THE DESIRED IMAGE.
;
MATCH:   MOVX      A,@R0     ;READ FIRST VISION PORT
         XRL       A,R3      ;DESIRED IMAGE?
         JNZ       MATCH3    ;RETURN IF NOT
```

```
            MOVX    A,@R1       ;READ SECOND VISION PORT

ANL     A,R4        ;MASK UNUSED PIXELS

XRL     A,R5        ;DESIRED IMAGE?

JNZ     MATCH3      ;RETURN IF NOT

SEL     RB1         ;SWITCH REGISTER BANKS

MOVX    A,@R0       ;READ THIRD VISION PORT

ANL     A,R2        ;MASK UNUSED PIXELS

XRL     A,R3        ;DESIRED IMAGE?

JNZ     MATCH2      ;RETURN IF NOT

MOVX    A,@R1       ;READ FOURTH VISION PORT

ANL     A,R4        ;MASK UNUSED PIXELS

XRL     A,R5        ;DESIRED IMAGE?

MATCH2:     SEL     RB0         ;RESTORE ORIGINAL REGISTER BANK

MATCH3:     RET

;SUBROUTINE         TIMER
;INPUTS:    R6´=HIGH ORDER BYTE OF COUNTER
;           R7´=LOW ORDER BYTE OF COUNTER
;OUTPUTS:   NONE
;CALLS:     NOTHING
;DESCRIPTION:   TIMER COUNTS DOWN THE COUNTER, THEN TURNS ON
;               THE AIR JET AND RETURNS.
;
;
TIMER:      SEL     RB1         ;SWITCH TO REGISTER BANK 1

INC     R7          ;LOOP CORRECTION FACTORS

INC     R6

TIMER0:     MOV     R1,#0       ;LOAD DELAY LOOP COUNTER

TIMER1:     DJNZ    R1,TIMER0   ;DELAY LOOP

DEC     R7          ;DECREMENT LOW ORDER BYTE OF COUNTER

MOV     A,R7        ;SEE IF R7=0

JNZ     TIMER0      ;IF NOT, LOOP

DEC     R6          ;IF SO, DECREMENT HIGH ORDER COUNTER
```

```
            MOV     A,R6        ;SEE IF R6=0

JNZ     TIMERO      ;IF NOT, LOOP

MOV     A,#1        ;IF SO, SETUP TO TURN AIR JET ON

MOVX    @R1,A       ;TURN IT ON

SEL     RB0         ;SWITCH BACK TO ORIGINAL REGISTER BANK

RET

;SUBROUTINE      DEBON

;INPUTS:    NONE

;OUTPUTS:   NONE

;CALLS:     NOTHING

;DESCRIPTION:    DEBON WAITS FOR THE INTERRUPT SIGNAL TO STOP
;                BOUNCING AND THEN TO GO AWAY.  THEN IT ENABLES
;                INTERRUPTS AND RETURNS.
;

DEBON:      JNI     DEBON       ;WAIT TIL INTERRUPT GONE

MOV     R2,#0FFH    ;MAKE SURE NOT BOUNCING

DEBON1:     JNI     DEBON

DJNZ    R2,DEBON1

RETR
```

We claim:

1. A programmable parts feeding system for feeding parts from a mixed batch in a programmed sequence comprising:

means for moving parts along a predetermined travel path;

means for rejecting a wrong or improperly oriented part from said travel path;

part silhouette recognizer means in said travel path and including a source of radiation, an apertured grid having a hole pattern which is operable to determine both part orientation and identification of a mixed batch of parts traveling along said travel path, and radiation sensing means coupled to said hole pattern for sensing the shadow image information of a part located on or traversing said grid;

controller means operable in accordance with a stored program and having memory means for storing part information therein, said controller means being coupled to said radiation sensing means and said rejecting means, and further including means for implementing a plurality of user selectable operational modes including an image mode for sensing the respective images of a plurality of properly oriented different types of parts to be fed out of the feeding system as well as assigning each part type a number and a portion of said memory means and thereafter storing sensed part image information of each part type at a respective portion of said memory means, a sequence mode for programming a predetermined positional sequence of different types of parts desired from said mixed batch followed by storing a part number sequence in said memory means, and a run mode to thereafter compare the sensed image information of parts traversing said grid with the stored image information of a desired part type in the order of said sequence to deactivate said rejecting means when a predetermined image match occurs during part feeding to permit a predetermined sequence of parts to be fed out of the parts feeding system in a programmed order and means for reactivating said rejecting means after the passage of the required properly oriented part past said rejecting means.

2. The system as defined by claim 1 wherein said plurality of operator selectable operational modes includes a test mode for terminating said image mode, when selected, whereby said part image information for a particular part is stored in said respective portion of said memory means.

3. The system as defined by claim 1 wherein said plurality of user selectable operational modes further includes a timer mode for determining and storing in said memory means the respective time interval for each properly oriented part type stored in said memory means to pass said rejecting means.

4. The system as defined by claim 3 wherein said plurality of operator selectable operational modes includes a test mode for terminating said timer mode, when selected.

5. The system as defined by claim 3 wherein said plurality of operator selectable operational modes includes a test mode for terminating both said image mode and said timer modes whereby said part image information and said time interval for a particular part type is respectively stored in said respective portion of said memory means.

6. The system as defined by claim 5 and wherein said test mode, when terminating said image mode, is operable to cause a mask for said particular part to be generated and stored in said memory means.

7. The system as defined by claim 6 wherein said test mode, when terminating said timer mode, is operable to retrieve the mask generated for that particular part, to apply said mask to sensed image information by selectively masking unused or unnecessary radiation sensing means of said radiation sensing means, generating therefrom a masked image, comparing the stored image for said part with the said masked image, and when an image match occurs, determining and storing said time interval of part travel past said rejecting means.

8. The system as defined by claim 6 wherein said run mode is operable to retrieve the previously generated mask for each desired part in the order of said sequence and mask unused or unnecessary radiation sensing means of said radiation sensing means in accordance with said mask to generate a masked image of parts traversing said grid for comparison with the stored image of the desired part in order to establish an image match for deactivating said rejecting means.

9. The system as defined by claim 5 wherein said means for implementing said plurality of user selectable operational modes includes first switch means for assigning each part type a part number and a corresponding portion of memory in said memory means, second switch means utilized in conjunction with said first switch means for programming said positional sequence into said memory means, and third switch means for selecting a desired operating mode including said image mode, said timer mode, said test mode, and said sequence mode.

10. The system as defined by claim 9 wherein said second and third switch means are additionally operable for selecting a run mode.

11. The system as defined by claim 9 wherein said third switch means is operable to generate respective interrupt signals, said controlling means being responsive to said interrupt signals to branch to the operational mode selected by activation of said third switch means.

12. A method of feeding a mixed batch of different types of parts in a programmed sequence from a parts feeding system, under the control of a controller; comprising the steps of:

moving said mixed batch of parts along a travel path including imaging means for sensing both the orientation and identification of said parts;

assigning each part type a part number and a portion of a memory;

sensing, one at a time, the respective shadow images of a plurality of properly oriented different types of parts to be fed out of the feeding system in an image mode, and storing sensed image information of each part in a respective portion of said memory;

programming a predetermined positional sequence of parts desired from said mixed batch in a sequence mode by entering and storing a desired part number sequence in said memory;

retrieving the stored image information of a desired part type in the order of said programmed sequence;

comparing image information of the sensed image of parts traversing said travel path with the stored image information of said desired part type; and ejecting an improperly oriented or undesired part type from said travel path unless an image match occurs between the sensed image and the retrieved image information while passing a properly oriented and desired part type past an ejection point to an output station in a run mode.

13. The method of claim 12 and additionally including the step of determining the respective time interval for each part type to pass said ejection point on said travel path and storing the time interval in said respective portion of memory for that part type in a timer mode; and retrieving the time interval of a desired part type in the order of said programmed sequence in said run mode for passing a properly oriented and desired part type to an output station.

14. The method of claim 12 and additionally including the steps of sensing and storing the operational state of said system when electrical power is removed and thereafter restoring the same operational state when power is subsequently restored.

15. The method of claim 12 and additionally including the steps of selectively terminating the image mode and the timer mode and performing a system testing procedure in a test mode.

16. The method of claim 15 wherein said step of terminating said image mode for each of said plurality of different types of parts in the test mode includes the steps of:

generating and storing a mask of unused or unnecessary image sensing elements for the respective type of part desired to be fed past said ejection point in said sequence; and storing said mask in said respective portion of memory.

17. The method of claim 16 wherein said step of performing a system testing procedure further includes the steps of:

sensing image information of a selected part type of said plurality of part types;

retrieving the mask stored for said part type;

applying said mask to said sensed image information and generating a masked image of said part type;

comparing the stored image with said masked image and in the event a match occurs, deactivating ejection means for the time interval of travel past said ejection means for said part type and thereafter again enabling the ejection means.

18. The method as defined by claim 16 wherein said run mode further includes the steps of:

retrieving the mask generated for the desired part number in the order of said sequence;

applying said mask to sensed image information by masking unused or unnecessary radiating sensing elements and generating a masked image of the respective parts traversing said travel path; and comparing the stored image information for the desired part at a particular sequence position with said masked image generated and ejecting parts from said travel path unless an image match occurs.

19. The method as defined by claim 12 wherein said step of programming a predetermined positional sequence comprises the further steps of:

selecting a sequence position;

determining which part number of said plurality of parts is to be fed out of said system for said sequence position;

checking said part number to ensure that it is a valid part number; and in the event that a valid part number is present, storing said part number at said sequence position.

20. The method as defined by claim 18 and additionally including the steps of assigning a terminal sequence position indicating the end of a sequence, and when encountered signalling selection of said run mode.

21. The system as defined by claim 1 and additionally including means for generating an interrupt signal coupled to said controller means in the event of the loss of power whereupon said controller means operates to save the current operating state of said system.

22. The system as defined by claim 1 wherein said controller means comprises digital controller means and said means for implementing a plurality of user selectable operational modes includes mode select switch means, and additionally including:

a multi-line digital bus coupled to said digital controller means;

vision output port means coupled between said radiation sensing means and said digital controller means via said bus;

mode input port means coupled between said mode switch means and said digital controller means via said bus;

second memory means for storing said program;

address latch means coupled between said digital controller means and said second memory via said system bus;

said second memory being further coupled back to said digital controller means via said bus;

output port means for controlling said rejecting means coupled to said digital controller means via said digital bus; and port selector means coupled to said digital controller means and being selectively operated in accordance with controller output signals for enabling the vision output port means, the mode input port means, and said output port means.

23. The system as defined by claim 1 wherein said hole pattern of said grid comprises a predetermined pattern for generating a low resolution digital image and having a relatively high discriminatory ability for a variety of part types and wherein said radiating sensing means comprises a respective light detecting circuit coupled to each aperture of said grid.

24. The system as defined by claim 1 wherein said travel path comprises a parts feeding track and wherein said means for rejecting a wrong or improperly oriented part comprises an air jet directed across said track and which is operable to blow a wrong or improperly oriented part from said track.

* * * * *